United States Patent [19]
Wieder

[11] Patent Number: 6,019,003
[45] Date of Patent: *Feb. 1, 2000

[54] FLOW SENSOR TURBINE ASSEMBLY WITH SAPPHIRE BEARING AND METALLIC INSERT

[75] Inventor: Horst K. Wieder, Watertown, Wis.

[73] Assignee: Cito Products, Inc., Watertown, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/909,522

[22] Filed: Aug. 12, 1997

[51] Int. Cl.$^7$ ........................................................ G01F 1/06
[52] U.S. Cl. ................................. 73/861.79; 73/861.77
[58] Field of Search ............................. 73/861.77, 861.78, 73/861.79, 861.91, 861.92

[56] References Cited

U.S. PATENT DOCUMENTS

| | | | |
|---|---|---|---|
| 3,648,824 | 3/1972 | Speck | 195/501 |
| 3,811,323 | 5/1974 | Swenson | 73/861.83 |
| 3,898,883 | 8/1975 | Kozak et al. | 73/861.77 |
| 4,182,175 | 1/1980 | Boehringer | 73/861.81 |
| 4,294,262 | 10/1981 | Williams et al. | 73/861.79 |
| 4,399,696 | 8/1983 | Feller | 73/861.77 |
| 4,428,243 | 1/1984 | Taylor | 73/861.77 |
| 4,467,660 | 8/1984 | McMillan | 73/861.77 |
| 4,819,745 | 4/1989 | Walter | 175/107 |
| 5,016,187 | 5/1991 | Forkert et al. | 73/861.77 |
| 5,337,615 | 8/1994 | Goss | 73/861.77 |
| 5,721,383 | 2/1998 | Franklin et al. | 73/861.79 |

OTHER PUBLICATIONS

CITO Products, Inc., "Instruction & Operation Manual, FlowReadout™, ThermoFlow™ Analyzer", not dated.

*Primary Examiner*—Harshad Patel
*Attorney, Agent, or Firm*—Foley & Lardner

[57] ABSTRACT

The present invention provides an improved flow sensor turbine assembly for fluid flow measurement. The flow sensor turbine is connected in fluid communication with a conduit through which a fluid whose flow rate is to be measured flows. The flow sensor turbine assembly includes a turbine, rotatably mounted on a turbine shaft, including turbine blades which rotate in response to the flow of fluid through the turbine assembly. Synthetic sapphire ball thrust bearings are provided adjacent to one or both ends of the turbine shaft to provide a low and consistent friction level and a high wear resistant bearing for the rotating turbine. Rotation of the turbine in the turbine assembly may be detected using an infrared rotation detector. Alternatively, a metallic insert may be positioned in one or more of the turbine blades. In such a case, rotation of the turbine may be detected using an inductive pick-up. The rate of flow through the turbine assembly is calculated from signals provided by the infrared or inductive pick-up rotation sensor in response to rotation of the turbine.

15 Claims, 4 Drawing Sheets

FLOW SENSOR TURBINE ASSEMBLY WITH SAPPHIRE BEARING AND METALLIC INSERT

FIELD OF THE INVENTION

This invention pertains generally to devices and methods for measuring the flow of fluids, and more particularly to flow measurement devices and methods employing rotary turbines.

BACKGROUND OF THE INVENTION

A conventional system for flow measurement employs a turbine assembly including a multi-blade rotary turbine. The turbine assembly is mounted in a fluid flow path such that the fluid flow through the turbine assembly and across the turbine blades causes the turbine to rotate. The rate of rotation of the turbine is linearly related to the rate of flow through the turbine assembly. Thus, if the rate of rotation of the turbine is known, the flow rate can be calculated accurately.

An infrared rotation sensor is typically used to detect the rate of rotation of the flow sensor turbine. A transparent window is provided in a sidewall of the turbine assembly. The infrared rotation sensor is attached to the turbine assembly and detects the passing of the turbine blades past the window in the sidewall thereof. At each pass of a rotary turbine blade, the infrared flow sensor may provide a signal pulse to a microprocessor controlled flow monitor, which calculates the flow rate through the turbine assembly from the calculated rate of rotation of the rotary turbine. The calculated flow rate may then be displayed, in either English or metric units, to a user of the flow rate measurement system. The microprocessor based flow monitor may also be programmed to provide various additional information and features based on the calculated flow rate. Such additional information and features might include, for example, calculation of cumulative flow through the turbine assembly, and the display of high or low flow rate alarms.

Flow sensor turbines employed in this conventional method of flow measurement exhibit inherent linear behavior over a range of flow rates. Thus, flow measurement systems employing such turbines typically do not require linearization for accurate flow measurement readings to be obtained. However, such flow measurement systems must be calibrated for the flow sensor turbine assembly which is employed. For example, the flow measurement system must typically be calibrated to the number of signal pulses, corresponding to each pass of the rotary turbine blade past the rotation sensor, per gallon of fluid flowing through the turbine assembly.

In typical prior art flow sensor turbine assemblies, the turbine blades are mounted on a turbine shaft bearing, which is typically made of bronze. The turbine shaft bearing is rotatably mounted on a turbine shaft. The turbine shaft is mounted in the turbine assembly between end thrust bearings made, e.g., of tungsten carbide. In conventional turbine assemblies, the end thrust bearings may be implemented as tungsten carbide ball bearings. As fluid flows through the turbine assembly, the turbine blades are rotated by the fluid flow, and the turbine shaft bearing rotates against the end thrust bearings. In order to maintain the linear behavior of the turbine assembly, it is important that the friction between the turbine shaft bearing and the end thrust bearings in the turbine assembly remain low and constant across a wide range of flow rates through the turbine assembly. Moreover, in order to maintain accurate flow measurement, without repeated recalibration, it is important that the friction between the turbine shaft bearing and the thrust bearings remain low and constant over extended periods of use of the turbine assembly. It has been found, however, that conventional tungsten carbide thrust bearings do not provide a low and consistent friction level over a wide range of flow rates. Also, such conventional thrust bearings can exhibit wear, and thus friction variations, after extended use of the turbine assembly, thereby affecting flow measurement accuracy, and requiring repeated recalibration of the flow sensor system.

As just discussed, a conventional flow sensor system typically employs an infrared rotation sensor placed adjacent to a window in the side wall of a turbine assembly to detect the rotation of the turbine blades which are mounted within the assembly. An infrared sensor is used because infrared frequency radiation is better able to penetrate a wide variety of fluid materials for which flow measurements may be made by flowing the fluid through the turbine assembly. However, it may be desirable to measure the flow of fluids which are completely or partially opaque to or otherwise mask infrared frequencies, such as high temperature materials. In such a case, a conventional infrared rotation sensor may not be used to make an accurate flow measurement.

SUMMARY OF THE INVENTION

The present invention provides an improved flow sensor turbine and turbine assembly for flow measurement. In accordance with the present invention, a turbine shaft bearing of a flow sensor turbine is rotatably mounted in a turbine assembly so as to bear on a synthetic sapphire ball thrust bearing. The synthetic sapphire ball thrust bearing provides a low and consistent friction level over a wide range of flow rates through the turbine assembly, and is highly wear resistant. Thus, a flow sensor turbine assembly in accordance with the present invention may be used to provide accurate flow measurements over a wide range of flow rates, and after extended use of the turbine assembly. In accordance with the present invention, synthetic sapphire ball thrust bearings may be mounted in the turbine assembly at one or both ends of the turbine shaft bearing.

A synthetic sapphire ball thrust bearing preferably is mounted in a position in the turbine assembly so as to form a single point of contact bearing with the turbine shaft bearing. Several different arrangements may be employed in accordance with the present invention for mounting the synthetic sapphire ball thrust bearing in the proper position in the turbine assembly so as to provide the required clearance between the bearing and the turbine shaft, on which the turbine shaft bearing is mounted. The required clearance may be provided in the turbine shaft, in the synthetic sapphire ball thrust bearing, or both.

In accordance with the present invention, a metallic insert may be positioned in or on at least one of the rotary flow sensor turbine blades. A flow measuring instrument employing an inductive pick-up rotation sensor may be placed adjacent to the turbine assembly to detect each pass of the metallic insert in the turbine blade or blades as the turbine is rotated by a fluid flowing through the turbine assembly. Signals provided by the inductive pick-up rotation sensor in response to each pass of the metallic insert may be employed by the flow measuring instrument to calculate the flow rate through the turbine assembly. Unlike known infrared rotation sensors, a flow sensor employing an inductive pick-up rotation sensor in accordance with the present invention is not affected by the opacity or temperature of the fluid flowing through the turbine assembly. Thus, a turbine assembly with a metallic insert in accordance with the present invention may be employed to make accurate flow measurements of a wider variety of fluid materials than conventional infrared flow sensor devices.

Other objects, features, and advantages of the present invention will be apparent from the following detailed description taken in conjunction with the accompanying drawings.

DETAILED DESCRIPTION OF THE INVENTION

Figure 1:
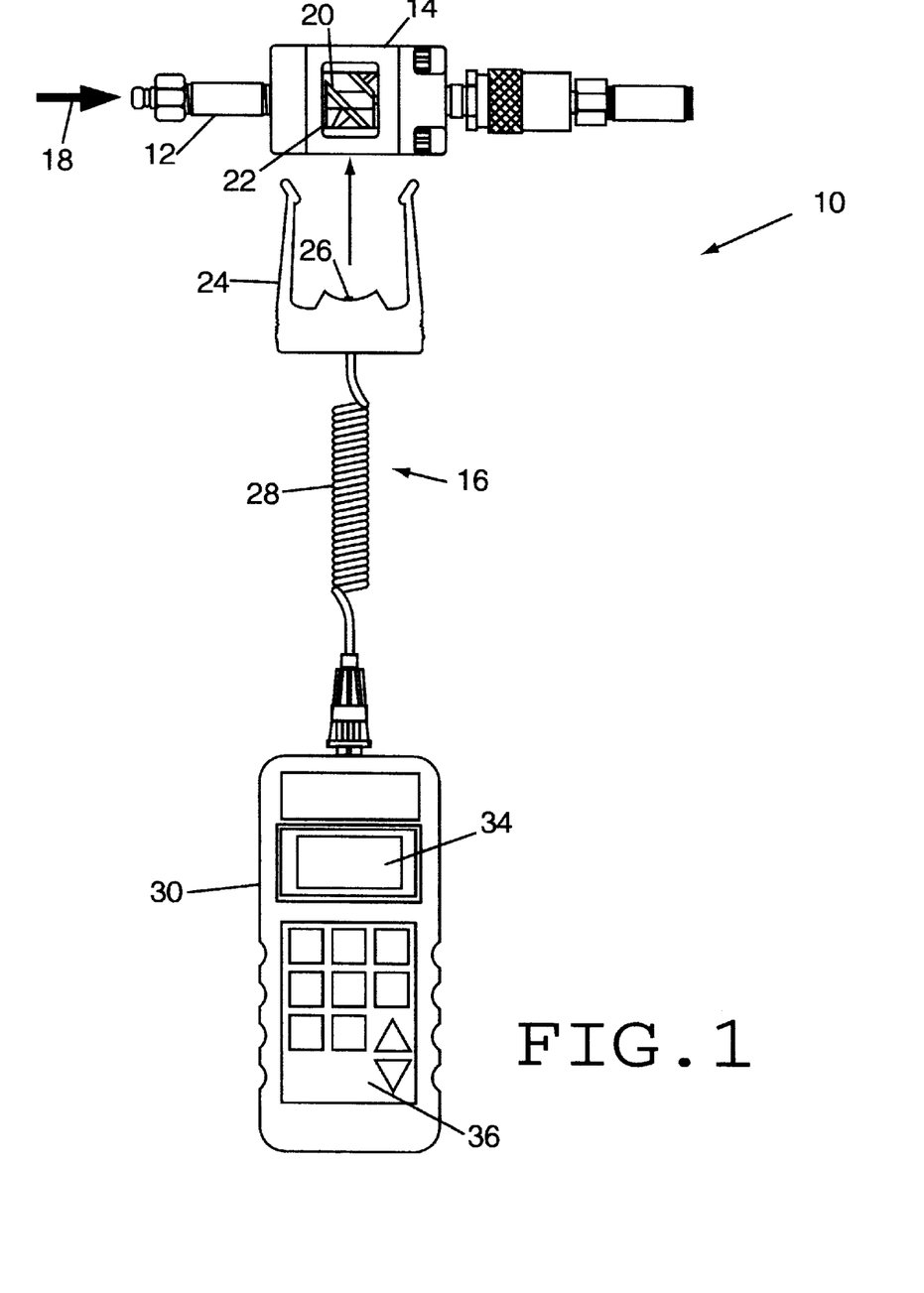
FIG. 1 is a schematic illustration of a flow measurement system in accordance with the present invention.

A system 10 for measuring the flow of a fluid through a conduit 12 is illustrated in and will be described with reference to FIG. 1. The two main components of the flow measurement system 10 are a turbine assembly 14 and a flow measurement instrument 16. The turbine assembly 14 is connected in fluid communication with the conduit 12 such that a fluid flowing through the conduit 12, in the direction indicated by arrow 18, will flow through the turbine assembly 14. The flow of fluid through the turbine assembly 14 causes a turbine 20 within the turbine assembly 14 to rotate. The rotation of the turbine 20 is linearly related to the flow rate through the turbine assembly 14. Thus, the flow rate through the conduit 12 can be determined from the rate of rotation of the turbine 20. A transparent window 22 is provided in the sidewall of the turbine assembly 14 to allow observation of the rate of rotation of the turbine 20.

The rate of rotation of the turbine 20 is measured using the flow measuring instrument 16. The flow measuring instrument 16 also calculates the flow rate through the conduit 12 from the measured rotation of the turbine 20, and displays the calculated flow rate, and other information derived therefrom, to a user.

The flow measuring instrument 16 includes a rotation sensor 24 which is preferably removably attachable to the turbine assembly 14. Conventional rotation sensors 24 include an infrared sensor 26. When the rotation sensor 24 is attached to the turbine assembly 14, infrared sensor 26 is placed against the transparent window 22. The infrared sensor 26 responds to each pass of a blade of the rotary turbine 20 past the window 22 by sending a signal pulse along a connecting cable 28 to a microprocessor controlled flow monitor 30. The infrared sensor 26 is able to detect the rotation of the turbine blades through a variety of fluids which may be flowing through the turbine assembly. Although a visual wavelength optical sensor might be employed in place of the infrared sensor 26, such a sensor may not be able to detect accurately the rotation of the turbine 20 when visually opaque fluids are flowing through the turbine assembly 14.

In accordance with the present invention, the rotation sensor 24 may employ an inductive pickup in place of the infrared sensor 26. As will be described in more detail below, a metallic insert may be positioned in the blade or blades of the turbine 20. The inductive pickup 26 in the rotation sensor 24 is responsive to the metallic insert, producing a signal pulse in response to each pass of a metallic insert positioned in a turbine blade. As with the conventional infrared rotation sensor, these signal pulses may be provided along a connecting cable 28 to the microprocessor controlled flow monitor 30.

The microprocessor controlled flow monitor 30 calculates the flow rate through the turbine assembly 14, and thus through the conduit 12, based on the signal pulses which are provided on the connecting cable 28 from the rotation sensor 24 which is responsive to the rotation of the turbine 20. The calculation of the flow rate from the signal pulses provided by the rotation sensor 24 may be performed in a conventional manner. The calculated flow rate may be displayed to a user, in, e.g., either English or metric units, on a monitor display, such as an LCD display 34. The microprocessor controlled flow monitor 30 may also be programmed to provide additional information based on the calculated flow rate, such as maximum and minimum flow, accumulative flow, and high or low flow alarms. Such additional information may also be displayed on the flow monitor display 34. The microprocessor controlled flow monitor 30 may be provided with a keyboard 36, to allow a user to select the information to be displayed on the flow monitor display 34, and to provide calibration of the flow monitor 30, as required. An example of a conventional microprocessor controlled flow monitor 30 which may be used to implement the present invention is the FlowReadout™ hand held flow measuring instrument made and sold by CITO Products, Inc., of Watertown, WI. Although the FlowReadout™ instrument, and other similar flow measuring instruments, are designed for use with rotation sensors 24 employing infrared sensors, it should be apparent that those skilled in the art will be able to use the same or similar devices in combination with a rotation sensor employing an inductive pickup sensor in accordance with the present invention.

Figure 2:
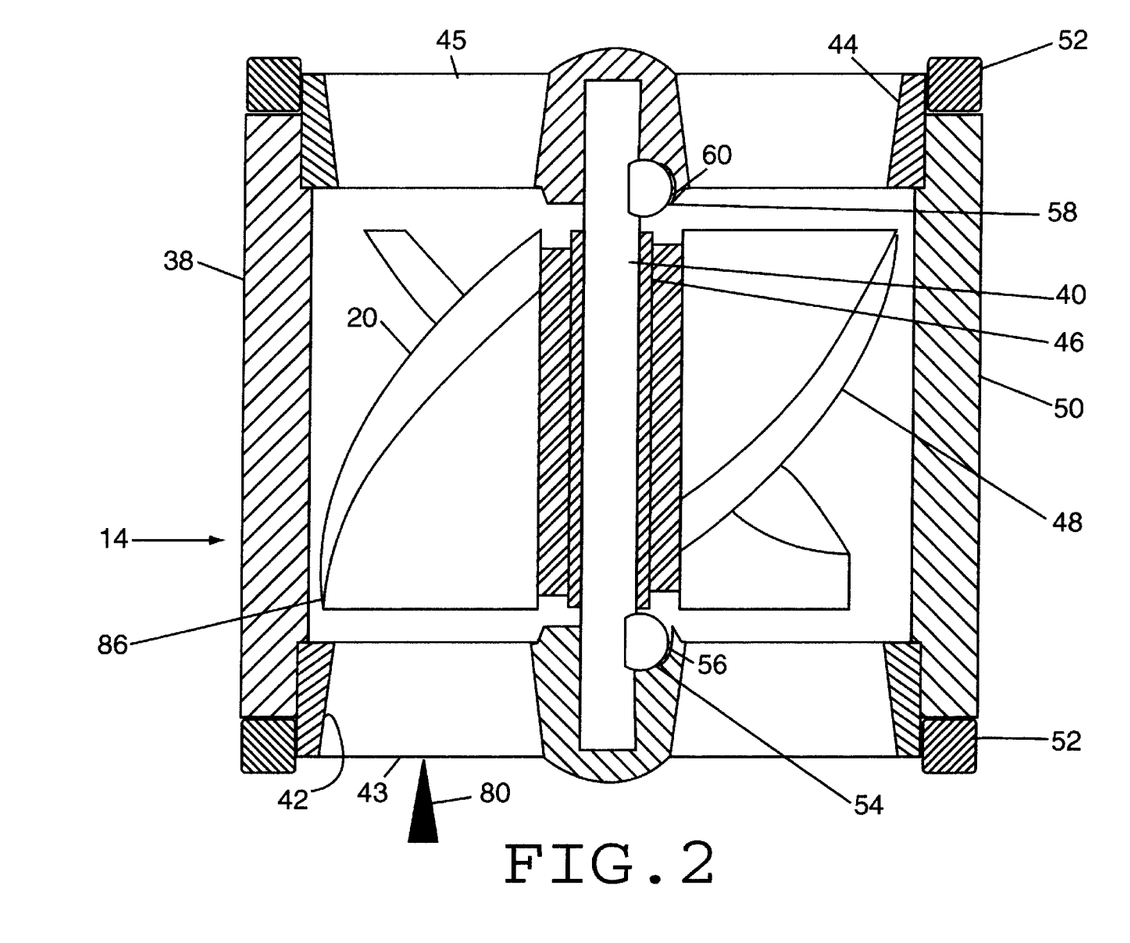
FIG. 2 is a schematic illustration, in partial cross section, of a flow sensor turbine assembly including synthetic sapphire ball thrust bearings at each end of a rotary turbine in accordance with the present invention.

An exemplary flow sensor turbine assembly 14 in accordance with the present invention will be described in more detail with reference to FIG. 2, which illustrates the turbine assembly 14 in a schematic partial cross section. The turbine assembly 14 includes a housing 38 in which the turbine 20 is rotatably mounted. The turbine 20 includes a turbine shaft 40, having first and second ends which are fixedly mounted in first and second turbine shaft support structures 42 and 44, respectively. The turbine shaft 40 may be made of a material such as tungsten carbide, although other materials may also be used. The first and second turbine shaft support structures 42 and 44 form ends of the generally cylindrically shaped turbine assembly housing 38. Apertures 43 and 45 are provided in the first and second turbine shaft support structures 42 and 44, respectively. The apertures 43 and 45 allow fluid to flow through the turbine assembly 14 across the turbine 20. The size and shape of the apertures 43 and 45 may be selected in a conventional manner based on the desired flow rating of the turbine assembly 14.

A turbine shaft bearing 46 is rotatably mounted on the turbine shaft 40. The turbine shaft bearing 46 may be made of a material such as bronze, although other materials may also be used. One or more turbine blades 48 are fixedly mounted to the turbine shaft bearing 46. The turbine blades 48, preferably made of a plastic material, such as acital, may be friction mounted to the turbine shaft bearing 46, or mounted to the turbine shaft bearing 46 using an adhesive. The preferred number and size of the turbine blades 48 depends on the typical flow rate range which the turbine assembly 14 is designed to detect. Three blade and six blade turbines 20 are conventional and are preferably used.

A tubular wall 50 joins together the first and second turbine shaft support structures 42 and 44, forming a sidewall of the turbine assembly housing 38. Preferably, the sidewall 50 is made of an optically transparent plastic material, or, alternatively, an optically transparent window may be formed in an otherwise opaque sidewall structure 50. If a metallic insert is placed in one or more of the turbine blades 48, as will be described in more detail below, and an inductive pick-up is used to detect rotation of the blades 48, the sidewall structure 50 need not have an optically or infrared transparent portion. O-rings 52, made, for example, of synthetic rubber, are positioned at the ends of the sidewall 50. The O-rings 52 provide a fluid tight joint between the sidewall 50 and the first and second turbine shaft support structures 42 and 44. Preferably, the turbine assembly 14 illustrated in FIG. 2 is enclosed within an outer housing (not shown in FIG. 2) which includes appropriate hardware, made, e.g., of stainless steel, for connecting the turbine assembly 14 in fluid communication with a conduit 12 through which a fluid whose flow is to be measured will flow (See FIG. 1). Such housing structures are well-known to those skilled in the art, and so are not discussed in further detail herein.

In accordance with the present invention, a synthetic sapphire ball thrust bearing 54 is mounted in the first turbine shaft support structure 42. The synthetic sapphire ball thrust bearing 54 is positioned in the turbine assembly 14 such that the turbine shaft bearing 46 is positioned to bear against the synthetic sapphire ball thrust bearing 54. Preferably, a pocket 56 is provided in the first turbine shaft support structure 42 for mounting the synthetic sapphire ball thrust bearing 54 in the proper position therein. A second synthetic sapphire ball thrust bearing 58 similarly may be mounted in a pocket 60 in the second turbine shaft support structure 44. The second synthetic sapphire ball thrust bearing 58 is mounted in a position in the second turbine shaft support structure 44 such that the second synthetic sapphire ball thrust bearing 58 is aligned with the turbine shaft bearing 46.

The synthetic sapphire ball thrust bearings 54 and 58 are made of a synthetic sapphire material. This material is often ruby in color, and thus the term "synthetic sapphire", as used throughout this specification and the appended claims, should be understood to include similar materials manufactured or sold as synthetic "ruby" material. An exemplary chemical composition and preferred properties of a synthetic sapphire material which may be used to make the synthetic sapphire ball thrust bearings 54 and 58 are listed below. It should be understood, however, that the present invention is not limited to synthetic sapphire ball thrust bearings made from the exemplary synthetic sapphire material listed below, or a synthetic sapphire material having the exact formula, structure, or properties listed below, but should be understood to include synthetic sapphire ball thrust bearings made from any synthetic sapphire material having properties similar to that of the preferred synthetic sapphire material described below.

GENERAL

| | |
|---|---|
| Chemical Formula: | $Al_2O_3$ |
| Crystallographic Structure: | Hexagonal Rhombohedral Single Crystal |

OPTICAL

| | |
|---|---|
| Transmission: | Up to 98% total transmission as measured by integrating sphere method. |
| Index of refraction (Birefringent) | No: 1.768 (sodium D line) |
| | Ne: 1.760 (sodium D line) |
| Emittance <0.02 at 880° C. where Thermal Optic Coefficient (dn/dT): | $\lambda$ = 2.6 to 3.7 micron 13 × $16^{-6°}$ C. (visible) |

CHEMICAL

| | |
|---|---|
| Acid Resistance: | Resistant to all acids at room temperature. Some etching occurs with boiling phosphoric acid. |
| Weathering Resistance: | Not affected by exposure to any atmospheric phenomenon, including industrial pollution. |
| Salt Water Resistance: | Not affected by salt water and resists the growth of salt water algae. |
| Medical: | Non-thrombogenic. Not affected by body fluids. |

PHYSICAL/MECHANICAL

| | |
|---|---|
| Density: | 0.143 lb/in$^3$ (3.97 gm/cm$^3$) |
| Specific Gravity: | 3.98 |
| Tensile Strength: | 60,000 PSI (approx. - design min. at 25° C.) |
| | 39,000 PSI (approx. - design min. at 500° C.) |
| | 51,000 PSI (approx. - design min. at 1,000° C.) |
| Compressive Strength: | 300,000 PSI |
| Youngs Modulus: | 50–55 × 10$^6$ PSI (at 25° C.) |
| Modulus of Rupture: | 40–130,000 PSI (at 30° C.) |
| | 23,000–50,000 (at 540° C.) |
| Modulus of Rigidity: | 25 × 10$^6$ PSI |
| Bulk Modulus: | 33 × 10$^6$ |
| Poissons Ratio: | 0.28–0.33 |
| Hardness: | 9 Mohs, 1800 Knoop parallel to C-axis |
| | 2200 Knoop perpendicular to C-axis |
| Coefficient of Friction: | 0.15 against steel |
| Porosity: | 0% |

ELECTRICAL

| | |
|---|---|
| Dielectric Strength: | 480,000 volt/cm (at 60 Hz) |
| Resistivity: | 10$^{16}$ ohm – cm (at 25° C.) |
| | 10$^{11}$ ohm – cm (at 500° C.) |
| | 10$^6$ ohm – cm (at 1000° C.) |
| Dielectric Constant: | 11.5 parallel to C-axis (10$^3$ Hz at 25° C.) |
| | 9.3 perpendicular to C-axis (10$^3$ Hz at 25° C.) |
| Loss Tangent: | 8.6 × 10$^{-5}$ parallel to C-axis (10$^{10}$ Hz at 25° C.) |
| | 3.0 × 10$^{-5}$ perpendicular to C-axis (10 Hz at 25° C.) |

THERMAL

| | |
|---|---|
| Melting Point: | 2050° C. |
| Maximum Operating Temperature: | 2000° C. |
| Thermal Coefficient of Expansion: | 5.3 × 10$^{-6}$/parallel to C-axis (at 25° C.) |
| | 4.5 × 10$^{-6}$/perpendicular to C-axis (at 25° C.) |
| Thermal Conductivity: | 0.086 cal/sec – cm$^2$ |
| Specific Heat: | 0.12 cal/gm (at 25° C.) |
| Heat capacity: | 77.8 joules/deg. mole |

Synthetic sapphire balls which may be used as synthetic sapphire ball thrust bearings in accordance with the present invention are available in various sizes from the Swiss Jewel Company, Suite 613, LaFayette Building, Philadelphia, PA.

The synthetic sapphire ball thrust bearing 54 or 58 is preferably mounted with respect to the turbine shaft bearing 46 such that an end of the cylindrical wall forming the turbine shaft bearing 46 is aligned with the center of the generally spherical synthetic sapphire ball bearing to form a single point of contact bearing. In order to achieve this preferred positioning, clearance must be provided between the synthetic sapphire ball bearing and the turbine shaft 40. This clearance may be provided on the turbine shaft 40, the synthetic sapphire ball bearing, or both.

Figure 3A:
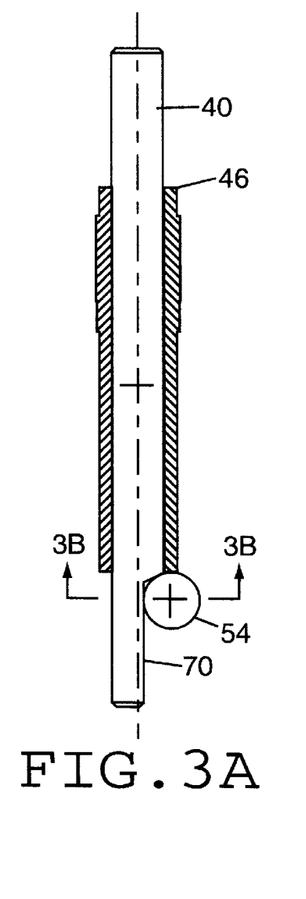
FIGS. 3–5 are schematic illustrations of three different arrangements for providing clearance between a turbine shaft and a synthetic sapphire ball thrust bearing in accordance with the present invention.
Figure 3B:
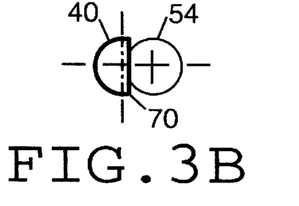

Three alternative arrangements for providing the clearance required for proper positioning of the synthetic sapphire ball thrust bearing 54 are illustrated in and will be described with reference to FIGS. 3–5. As illustrated in FIGS. 3A and 3B, the necessary clearance may be provided by a clearance notch 70 formed in the turbine shaft 40 adjacent to the synthetic sapphire ball thrust bearing 54. The spherical synthetic sapphire ball thrust bearing 54 is positioned within the clearance notch 70 such that the end of the cylindrical wall forming the turbine shaft bearing 46 is aligned with the center of the spherical bearing 54.

Figure 4A:
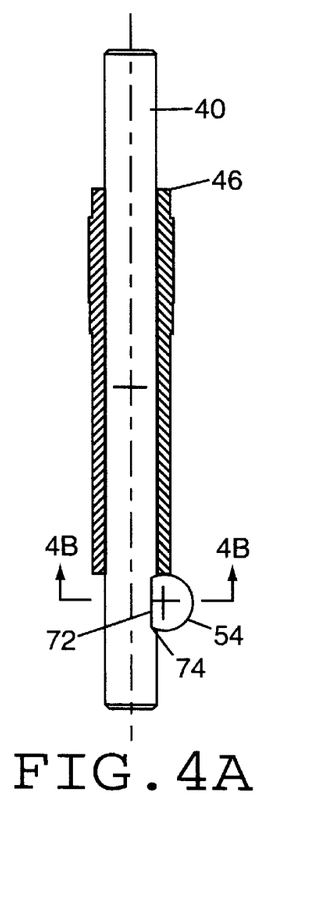
Figure 4B:
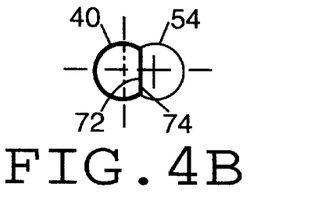

As illustrated in FIGS. 4A and 4B, the clearance required for proper positioning of the synthetic sapphire ball thrust bearing 54 may be provided by a clearance notch 72 formed in the turbine shaft 40 with a corresponding clearance surface 74 formed on the synthetic sapphire ball thrust bearing 54. The flat clearance surface 74 may be formed on the synthetic sapphire ball thrust bearing 54 by grinding down the synthetic sapphire ball using a diamond grinding wheel or similar device. The synthetic sapphire ball thrust bearing 54 may then be positioned such that the end of the cylindrical wall forming the turbine shaft bearing 46 is aligned with the center of the spherical bearing 54 and such that the clearance notch 72 formed in the turbine shaft 40 is adjacent to the clearance surface 74 formed in the synthetic sapphire ball 54.

Figure 5A:
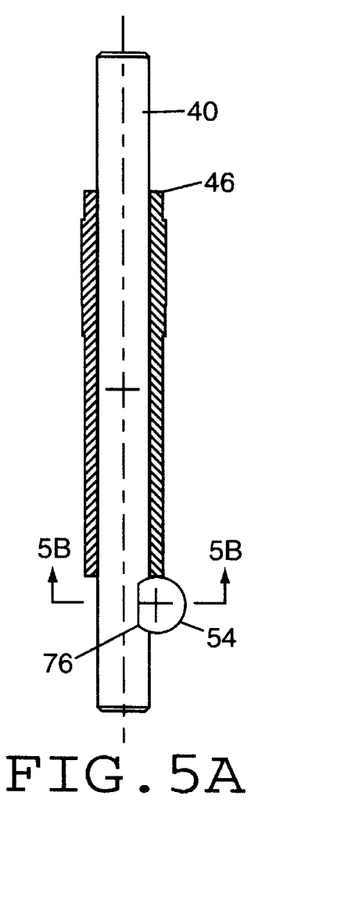
Figure 5B:
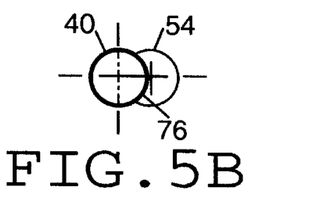

A third arrangement for providing the clearance required for proper positioning of the synthetic sapphire ball thrust bearing 54 is illustrated in FIGS. 5A and 5B. In this case, a clearance notch 76 is formed in the synthetic sapphire ball thrust bearing 54. The clearance notch 76 may be formed by holding the synthetic sapphire ball bearing 54 in a vice or similar device and using a diamond edged cutting blade to remove material from the synthetic sapphire ball thrust bearing 54 to form the clearance notch 76. The synthetic sapphire ball thrust bearing 54 may then be positioned such that the end of the cylindrical wall forming the turbine shaft bearing 46 is aligned with the center of the synthetic sapphire ball thrust bearing 54 by positioning the clearance notch 76 formed in the synthetic sapphire ball thrust bearing 54 around the generally cylindrically shaped turbine shaft 40.

Returning to FIG. 2, a flow sensor turbine assembly 14 in accordance with the present invention operates generally as follows. The turbine assembly 14 is connected in fluid communication with a fluid carrying conduit 12 (as illustrated in FIG. 1) such that a fluid flows through the turbine assembly 14 (in the direction indicated by arrow 80) via the apertures 43 and 45 in the first and second turbine shaft support structures 42 and 44. Fluid flowing through the turbine assembly 14 first contacts the cutting edge 86 of the turbine blades 48. This causes the turbine 20 to rotate. As fluid flows through the turbine assembly 14, the rotating turbine shaft bearing 46 is thrust against one of the synthetic sapphire ball thrust bearings 54 and 58. In accordance with the present invention, the use of synthetic sapphire ball thrust bearings provides a consistently low friction level between the bearings 54 and 58 and the turbine shaft bearing 46 across a wide range of turbine rotation rates. Thus, the rate of rotation of the turbine 20 with respect to the flow rate through the turbine assembly 14 will remain linear across a broad range of flow rates. Also, the synthetic sapphire ball thrust bearings 54 and 58 are highly wear resistent. Therefore, the friction level between the bearings 54 and 58 and the turbine shaft bearing 46 will remain constant over long periods of operation of the turbine assembly 14. Thus, accurate flow measurements may be obtained using a turbine assembly 14 in accordance with the present invention without requiring extensive recalibration of the system after extended periods of use.

Figure 6:
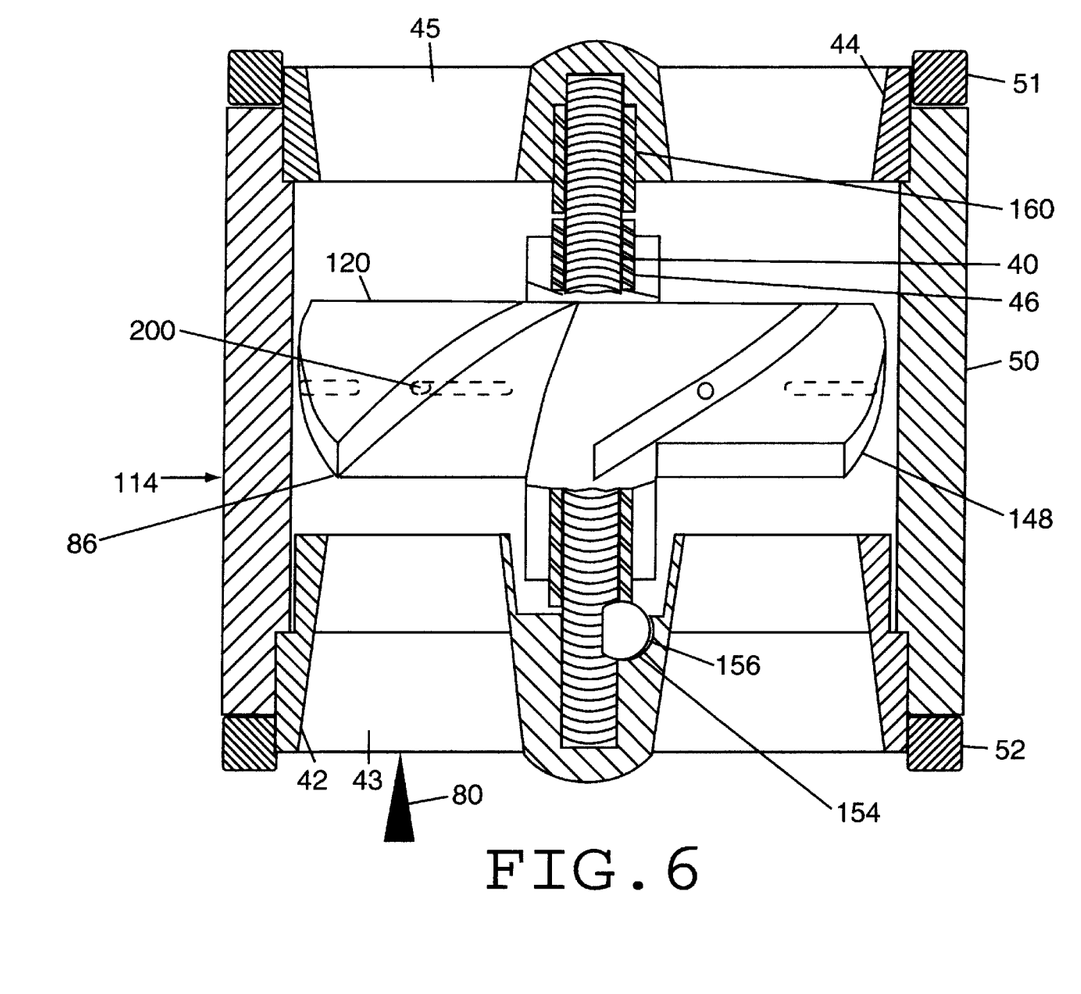
FIG. 6 is a schematic illustration, in partial cross section, of a flow sensor turbine assembly including a single sapphire ball thrust bearing at one end of a rotary turbine in accordance with the present invention.

An alternative embodiment of a flow sensor turbine assembly 114 in accordance with the present invention is illustrated in and will be described with reference to FIG. 6. The same reference numerals used to designate parts of the turbine assembly 14 illustrated in FIG. 2 are used to designate identical or similar parts of the alternative embodiment turbine assembly 114 illustrated in FIG. 6. The alternative embodiment turbine assembly 114 illustrated in FIG. 6 is adapted for the measurement of lower flow rates than the turbine assembly 14 illustrated in FIG. 2. The alternative embodiment turbine assembly 114 includes a turbine 120 having six turbine blades 148. Note also that the turbine blades 148 in the low flow rate turbine assembly 114 are also generally shorter with respect to the length of the turbine assembly 114 than the turbine blades 48 in the turbine assembly 14 illustrated in FIG. 2.

The alternative embodiment turbine assembly 114 employs a single synthetic sapphire ball thrust bearing 154 to implement a turbine assembly 114 in accordance with the present invention. In this case, the single synthetic sapphire ball thrust bearing 154 is positioned in a pocket 156 in the first turbine shaft support structure 42 such that the end of the cylindrical wall forming the turbine shaft bearing 46 is aligned with the center of the synthetic sapphire ball thrust bearing 154 to form a single point of contact bearing. Clearance may be provided for proper positioning of the synthetic sapphire ball thrust bearing 154 using any of the arrangements discussed previously with reference to FIGS. 3–5. In place of the second synthetic sapphire ball thrust bearing 58 used in the turbine assembly 14 of FIG. 2, the turbine assembly 114 illustrated in FIG. 6 employees a cylindrical bearing insert 160 mounted in the second turbine shaft support structure 44 around the turbine shaft 40 and aligned with the turbine shaft bearing 46. The cylindrical bearing insert 160 may be made of a material such as tungsten carbide, although other materials may also be used.

In accordance with the present invention, a metallic insert 200 may be inserted in one or more of the turbine blades 148. The metallic insert 200 may be implemented, for example, as a stainless steel or copper pin inserted into the outer edge of the turbine blade 148. Any material the motion of which may be detected using an inductive pick-up may be used to implement the metallic insert 200. The metallic insert may be adhered onto the edge of the turbine blade 148, or mounted in or attached to the face of the turbine blade 148. It should be understood that when it is stated in this specification or in the appended claims that a metallic insert is positioned in a turbine blade, this should be understood to also mean a metallic insert mounted on a turbine blade.

The metallic insert 200 positioned in the turbine blade 148 allows the rotation of the turbine blade to be detected by an inductive pickup sensor placed adjacent to the sidewall 50 of the turbine assembly 114. This allows measurement of the flow of opaque or high temperature fluids through the turbine assembly 114 to be made by monitoring rotation of the turbine. Such an opaque or high temperature fluid might interfere with detection of turbine rotation using an infrared or visual wave length rotation detector. Since an inductive, rather than optical, method may be used to detect turbine rotation, the sidewall 50 of a turbine assembly 114 which includes one or more metallic inserts 200 in accordance with the present invention may be made of an optically opaque material. No optically transparent window is required in such a case. A method for employing a flow sensor turbine assembly including a metallic insert in accordance with the present invention for flow measurement was described in more detail previously with reference to FIG. 1.

It should be understood that a flow sensor turbine assembly in accordance with the present invention may employ one or more synthetic sapphire ball bearings, as discussed previously, metallic inserts in one or more turbine blades, or any of these features of the present invention individually, or in any combination.

It should be understood that this invention is not confined to the particular embodiments, implementations, and applications herein illustrated and described, but embraces all such modified forms thereof which come within the scope of the following claims.

What is claimed is:

1. A flow sensor turbine assembly, comprising:
   (a) a turbine shaft having first and second ends;
   (b) a tubular turbine shaft bearing having first and second ends of a tubular wall and rotatably mounted on the turbine shaft;
   (c) a turbine having at least one turbine blade mounted on the turbine shaft bearing;
   (d) first and second shaft support means for fixedly supporting the first and second ends of the turbine shaft;
   (e) a sidewall positioned between the first and second shaft support means and forming an enclosure for the turbine assembly;
   (f) apertures in the shaft support means for allowing a fluid flow through the turbine assembly;
   (g) a ball shaped thrust bearing mounted in the first shaft support means and positioned therein to bear against the first end of the tubular wall of the turbine shaft bearing such that a center of the ball shaped thrust bearing is aligned with a center of the first end of the tubular wall to form a single point of contact bearing; and
   wherein the turbine shaft has a clearance notch formed therein adjacent to the ball shaped thrust bearing and the ball shaped thrust bearing is spherical in shape and positioned adjacent to the clearance notch formed in the turbine shaft.

2. The flow sensor turbine assembly of claim 1 wherein the ball shaped thrust bearing is a synthetic sapphire ball thrust bearing.

3. The flow sensor turbine assembly of claim 1 comprising additionally a second ball shaped thrust bearing mounted in the second shaft support means and aligned with the second end of the tubular wall of the turbine shaft bearing such that a center of the second ball shaped thrust bearing is aligned with a center of the second end of the tubular wall to form a single point of contact bearing.

4. The flow sensor turbine assembly of claim 3 wherein the second ball shaped thrust bearing is a synthetic sapphire ball thrust bearing.

5. The flow sensor turbine assembly of claim 1 wherein the at least one turbine blade is made of a non-magnetic material and comprising additionally a non-magnetized metallic insert positioned in the at least one non-magnetic turbine blade.

6. A flow sensor turbine assembly, comprising:
   (a) a turbine shaft having first and second ends;
   (b) a tubular turbine shaft bearing having first and second ends of a tubular wall and rotatably mounted on the turbine shaft;
   (c) a turbine having at least one turbine blade mounted on the turbine shaft bearing;
   (d) first and second shaft support means for fixedly supporting the first and second ends of the turbine shaft;
   (e) a sidewall positioned between the first and second shaft support means and forming an enclosure for the turbine assembly;
   (f) apertures in the shaft support means for allowing a fluid flow through the turbine assembly;
   (g) a ball shaped thrust bearing mounted in the first shaft support means and positioned therein to bear against the first end of the tubular wall of the turbine shaft bearing such that a center of the ball shaped thrust bearing is aligned with a center of the first end of the tubular wall to form a single point of contact bearing; and
   wherein the turbine shaft has a clearance notch formed therein adjacent to the ball shaped thrust bearing and the ball shaped thrust bearing has a clearance surface formed therein and is positioned such that the clearance notch formed in the turbine shaft is adjacent to the clearance surface formed in the ball shaped thrust bearing.

7. The flow sensor turbine assembly of claim 6 wherein the ball shaped thrust bearing is a synthetic sapphire ball thrust bearing.

8. The flow sensor turbine assembly of claim 6 comprising additionally a second ball shaped thrust bearing mounted in the second shaft support means and aligned with the second end of the tubular wall of the turbine shaft bearing such that a center of the second ball shaped thrust bearing is aligned with a center of the second end of the tubular wall to form a single point of contact bearing.

9. The flow sensor turbine assembly of claim 8 wherein the second ball shaped thrust bearing is a synthetic sapphire ball thrust bearing.

10. The flow sensor turbine assembly of claim 6 wherein the at least one turbine blade is made of a non-magnetic material and comprising additionally a non-magnetized metallic insert positioned in the at least one non-magnetic turbine blade.

11. A flow sensor turbine assembly, comprising:
    (a) a turbine shaft having first and second ends;
    (b) a tubular turbine shaft bearing having first and second ends of a tubular wall and rotatably mounted on the turbine shaft;
    (c) a turbine having at least one turbine blade mounted on the turbine shaft bearing;
    (d) first and second shaft support means for fixedly supporting the first and second ends of the turbine shaft;
    (e) a sidewall positioned between the first and second shaft support means and forming an enclosure for the turbine assembly;

(f) apertures in the shaft support means for allowing a fluid flow through the turbine assembly;

(g) a ball shaped thrust bearing mounted in the first shaft support means and positioned therein to bear against the first end of the tubular wall of the turbine shaft bearing such that a center of the ball shaped thrust bearing is aligned with a center of the first end of the tubular wall to form a single point of contact bearing; and wherein the turbine shaft is cylindrical in shape and the ball shaped thrust bearing has a clearance notch formed therein and is positioned such that the clearance notch formed in the ball shaped thrust bearing is positioned adjacent to the turbine shaft.

12. The flow sensor turbine assembly of claim 11 wherein the ball shaped thrust bearing is a synthetic sapphire ball thrust bearing.

13. The flow sensor turbine assembly of claim 11 comprising additionally a second ball shaped thrust bearing mounted in the second shaft support means and aligned with the second end of the tubular wall of the turbine shaft bearing such that a center of the second ball shaped thrust bearing is aligned with a center of the second end of the tubular wall to form a single point of contact bearing.

14. The flow sensor turbine assembly of claim 13 wherein the second ball shaped thrust bearing is a synthetic sapphire ball thrust bearing.

15. The flow sensor turbine assembly of claim 11 wherein the at least one turbine blade is made of a non-magnetic material and comprising additionally a non-magnetized metallic insert positioned in the at least one non-magnetic turbine blade.

* * * * *